(No Model.)
S. F. SNIFFEN.
WATER CLOSET.
No. 396,623. Patented Jan. 22, 1889.
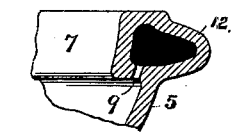
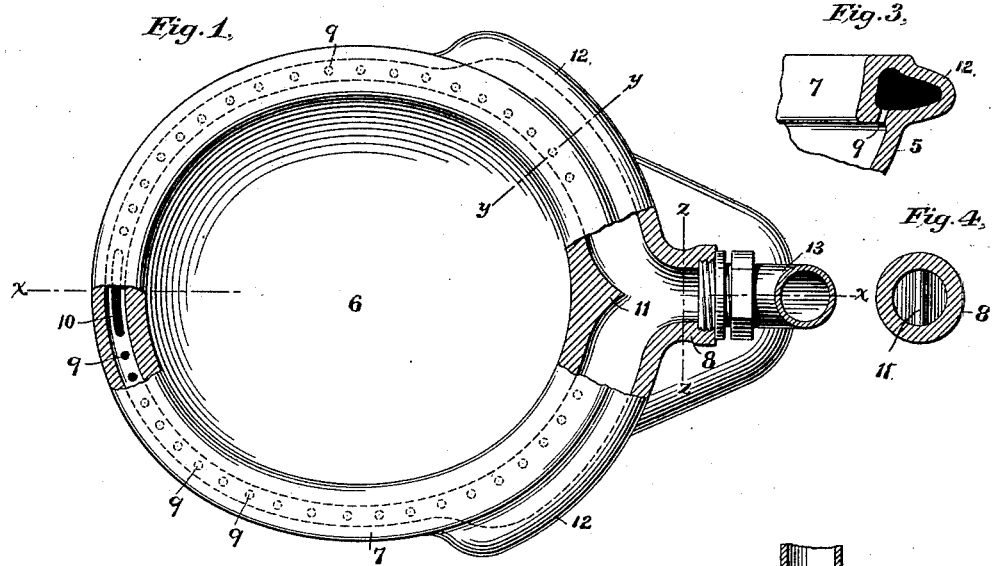
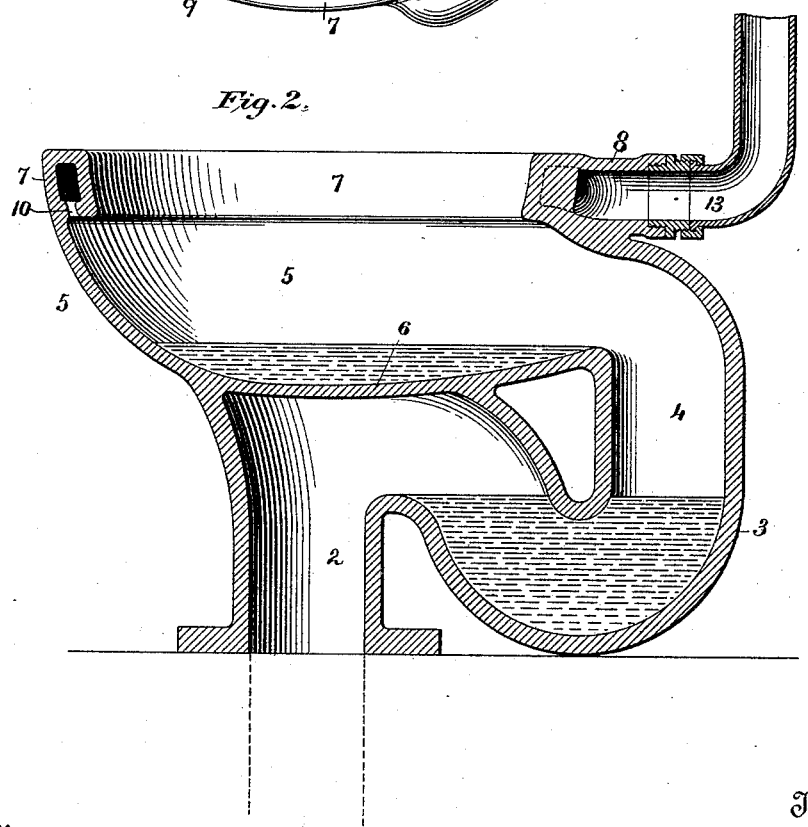
Witnesses.
Geo. W. Breck.
R. H. Doyle.
Inventor
Samuel F. Sniffen.
By his Attorney
Jacob Felbel.

UNITED STATES PATENT OFFICE.

SAMUEL F. SNIFFEN, OF NEW YORK, N. Y.

WATER-CLOSET.

SPECIFICATION forming part of Letters Patent No. 396,623, dated January 22, 1889.

Application filed July 31, 1888. Serial No. 281,567. (No model.)

*To all whom it may concern:*

Be it known that I, SAMUEL F. SNIFFEN, a citizen of the United States, and a resident of New York city, in the county of New York and State of New York, have invented certain new and useful Improvements in Water-Closets, of which the following is a specification.

My invention relates more particularly to that class of water-closets in which the contents of the bowl are delivered or discharged at the rear side by the force of the water escaping from the flushing-rim, (as seen, for instance, in the British patent, No. 649 of 1875,) and has for its objects to improve the construction and operation of the same.

To these ends my invention consists in the features of construction and combinations of parts, hereinafter more fully described, and particularly pointed out in the appended claims.

In the accompanying drawings, Figure 1 is a plan view, partly in section, of a water-closet embodying my invention. Fig. 2 is a vertical section on the line $x\ x$ of Fig. 1. Fig. 3 is a similar section on the line $y\ y$ of Fig. 1, and Fig. 4 is a like section on the line $z\ z$ of Fig. 1.

In the several views the same part will be found designated by the same numeral of reference.

The water-closet structure is preferably made in one piece, of earthenware, and consists of a hollow standard or support, 2, a trap portion, 3, a trunk or outlet, 4, a basin, 5, having a dishing bottom, 6, a flushing-rim, 7, and a supply-nozzle, 8.

My invention has special reference to the flushing-rim, which is provided with a number of small perforations, 9, at the sides of the bowl, and preferably with one larger perforation or slot, 10, at the front of the bowl and directly opposite the outlet or trunk 4 thereof; but instead of one large opening, 10, there may be provided several such openings of varying or equal discharging capacities, but larger than the side perforations, 9. At the rear of the bowl, and directly in line with the axis of the supply-nozzle 8, the flushing-rim is provided with a spear or wedge shaped projection, 11, for the purpose of dividing the stream of water and directing it equally around each side of the flushing-rim with practically no diminution of the force thereof.

At the rear of the bowl the flushing-rim is provided with an extension, 12, on each side to enlarge the diameter or capacity of the flushing-rim at the receiving ends. These portions 12 are formed integral with the flushing-rim and extend from the nozzle 8 on each side to about one-third the distance around the flushing-rim, and are curved to correspond with the curvature of the latter. The enlarged passage-way in the flushing-rim is shown by full and dotted lines at Fig. 1 and in section at Fig. 3. The forward extremities of the outer walls of the enlarged chambers curve gradually into narrower portions of the flushing-rim, so as to retard as little as possible the force of the water, and for a similar reason the sides of the divider 11 are curved gradually outward and forward to the inner wall of the flushing-rim. Connected to the mouth of the nozzle in any suitable manner is a supply-pipe, 13, which may be attached to a tank or other source of water-supply.

In the operation of the closet the water from the supply-pipe will rush into the nozzle of the bowl and against the divider 11, by which the column will be separated and streams directed into the enlarged chambers 12 on each side. Passing through the chambers 12 the rushing waters will enter the narrower portions of the flushing-rim with considerable force, pass round the same on opposite sides, and meet at the large opening or slot 10, and descend therethrough and through the smaller apertures in the flushing-rim, thoroughly washing down the walls of the bowl and driving the contents of the portion 6 rearwardly into the trunk, through the trap and standard, to the waste or soil pipe, which is shown in dotted lines at Fig. 2.

By providing the enlarged passage-ways 12 adjacent to the inlet-nozzle the narrower portions of the flushing-rim will be rapidly and completely filled and a back pressure created in the enlarged portions, which will serve to eject streams from the smaller apertures therein. Moreover, by this construction the large volume of water which enters the flushing-rim at the enlarged portions, being met by the contracted portions, is discharged through the latter with greater velocity, and, meeting at the slot at the front of the bowl, issues in large volume and with such great force as to insure the driving out of the contents of the bowl. Furthermore, by constructing a flushing-rim with enlarged and contracted portions, the supply for the washout is obtained in greater volume and with more force than if the flushing-rim were made of equal diameter or bore throughout.

By providing the divider 11, I am enabled to avoid the loss of force of the incoming water which would result if the inner wall of the flushing-rim opposite the inlet-nozzle were made comparatively flat, and hence am enabled to guide the divided streams directly into the enlarged passage-ways 12 of the flushing-rim with practically no diminution of force or pressure. In order to avoid this difficulty in the class of closets shown others previous to my invention have discarded the single central inlet-nozzle illustrated and provided in lieu thereof one nozzle on each side of the bowl entering the flushing-rim about tangentially, and provided the supply-pipe with branches extending to said nozzles. The last-mentioned closet I have found in practice is objectionable for the reason that it requires three couplings between the flushing-rim and the supply-pipe, is more expensive to make and set up than the closet herein illustrated, and is exceedingly liable to have the earthenware nozzles broken off in transportation and by the plumbers in the act of screwing up the couplings, the nozzles in practice being made separately from the body of the closet and attached thereto during the making of the structure.

What I claim as new, and desire to secure by Letters Patent, is—

1. A washout water-closet provided with an inlet-nozzle at the rear of the bowl, and having a perforated flushing-rim composed of contracted and enlarged portions, the latter being arranged adjacent to the inlet-nozzle, and the former extending from the enlarged portions to the front of the bowl and constructed thereat to provide the greatest discharge, substantially as set forth.

2. A washout water-closet provided with an inlet-nozzle at the rear of the bowl, a divider opposite said nozzle, and a perforated flushing-rim composed of contracted and enlarged portions, the latter being arranged adjacent to the inlet-nozzle, and the former extending from the enlarged portions to the front of the bowl and constructed thereat to provide the greatest discharge, as set forth.

Signed at New York city, in the county of New York and State of New York, this 30th day of July, A. D. 1888.

SAML. F. SNIFFEN.

Witnesses:
CHARLES H. SEAVER,
MARTIN C. AFLISCH.